May 13, 1958 W. H. TANKE 2,834,277
QUICK HITCH SYSTEM
Filed Aug. 13, 1953 3 Sheets-Sheet 1

Inventor
Willard H. Tanke
by
Attorney

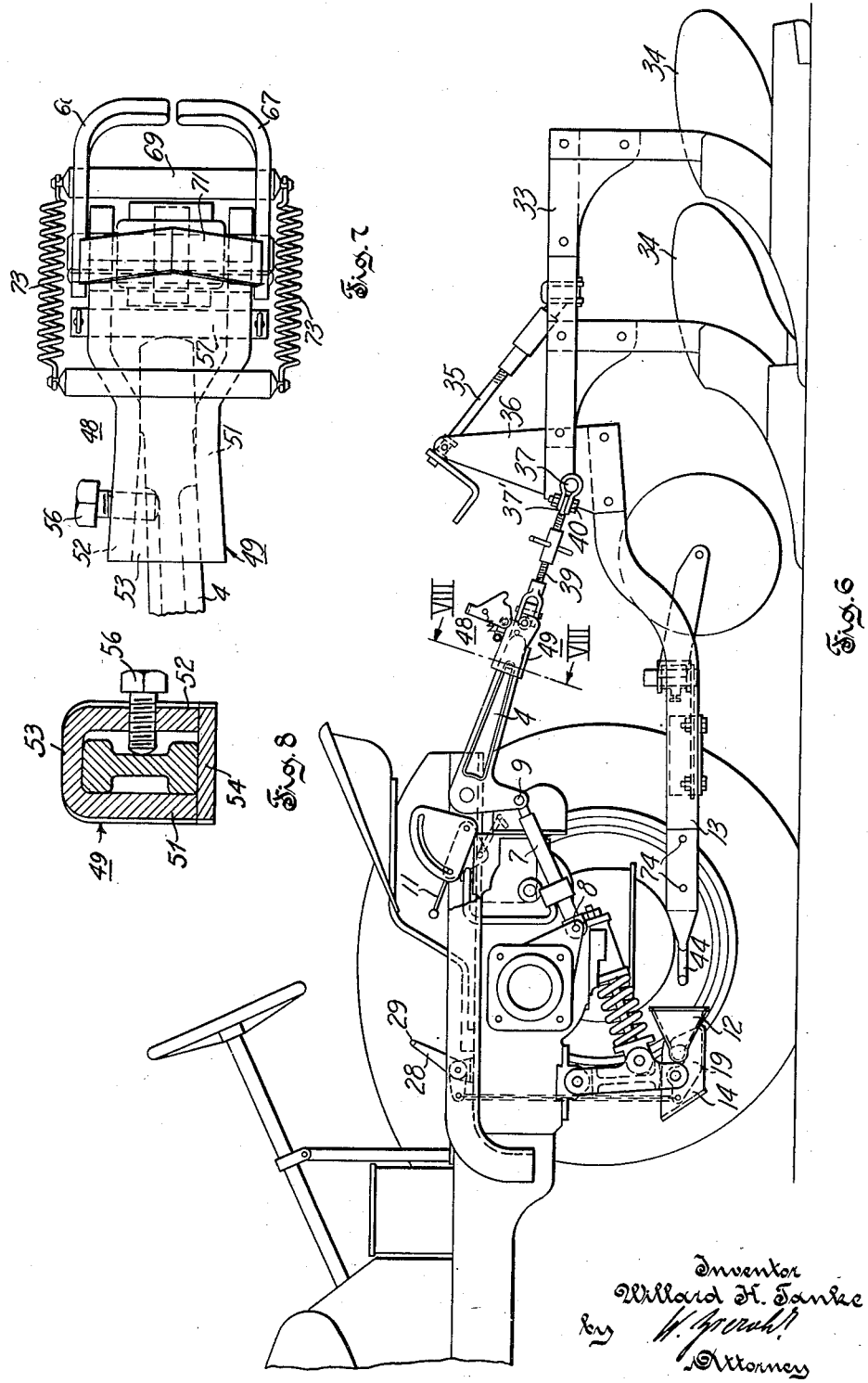

May 13, 1958 W. H. TANKE 2,834,277
QUICK HITCH SYSTEM
Filed Aug. 13, 1953 3 Sheets-Sheet 3

Inventor
Willard H. Tanke
by
Attorney

United States Patent Office 2,834,277
Patented May 13, 1958

2,834,277
QUICK HITCH SYSTEM

Willard H. Tanke, La Crosse, Wis., assignor to Allis-Chalmers Manufacturing Company, Milwaukee, Wis.

Application August 13, 1953, Serial No. 373,938

3 Claims. (Cl. 97—47.14)

The invention relates to farm machinery and it is concerned more particularly with the hitching of implements, such as plows, harrows, cultivators and the like, to a tractor.

Ordinarily, a farmer who owns a tractor also owns a variety of implements for use with that tractor, and it is important that the farmer be able to attach and detach any one of the various implements to the tractor with as little effort and in as short a time as possible. While the problem of quickly hitching an implement to, and unhitching it from, a tractor presents no particular difficulties if the implement is of the trail-behind type which only requires connection of an implement draft pole to the tractor, it is a much more difficult matter to provide a practical quick hitch system for a pickup type implement, that is, for an implement which is connectable with a tractor in such a manner that it can be adjusted up and down relative to the tractor and be supported entirely by the latter in an elevated position for transport purposes. In that case, it becomes necessary to provide not only for the transmission of draft from the tractor to the implement but also for the suspension of the implement on the tractor so that the entire implement can be readily lowered to any desired working position and raised to a suitable transport position. For that purpose, not one but a multiplicity of connections between the tractor and the implement must be provided, and these connections ordinarily do not readily lend themselves for a hitch system which permits change of implements within a relatively short time and with a minimum of effort.

Generally, it is an object of the invention to provide an improved quick hitch system for pickup type implements, which is simple and reliable; which requires no hand tools for the performance of the hitching and unhitching operations; and which can readily be used by a relatively inexperienced operator; the improved system being such that no precision maneuvering of the tractor is required for the performance of either the hitching or the unhitching operation and so that these operations can be conveniently performed even on unlevel ground.

More specifically, it is an object of the invention to provide an improved quick hitch system of the above outlined character that lends itself for use in connection with pickup implements of the type which have a forwardly extending hitch tongue for connection with the tractor at a point at the underside of the latter and forwardly of the rear ends of a pair of up and down swingable implement lift arms on the tractor.

Another object of the invention is to provide an improved quick hitch system of the hereinabove outlined character which will enable the operator to separate the entire tractor, including the implement lift arms, from the implement by simply operating a single control element, preferably a foot pedal, and then simply driving the tractor away from the implement, the latter being left standing on the ground ready for reattachment to the tractor if and when desired.

A further object of the invention is to provide an improved quick hitch system that lends itself for incorporation in existing equipment that the farmer may own.

A further object of the invention is to provide an improved self-releasing coupling device for use in a quick hitch system of the hereinabove outlined character, and more particularly for use between an implement lift arm on a tractor and a pickup type implement unit.

A further object of the invention is to provide an improved coupling device of the hereinabove outlined character in which a latch member is positively controlled by relative pivotal displacement of a pair of implement lift force and implement load transmitting elements.

A still further object of the invention is to provide an improved coupling device incorporating a positively controlled latch member and wherein the latch member is automatically moved into a released position beyond an initial releasing position to which it is moved by pivotal displacement of one of the coupled elements relative to the other.

The foregoing and other objects and advantages are attained by the present invention, various novel features of which will be apparent from the description herein and the accompanying drawings disclosing an embodiment of the invention, and will be more particularly pointed out in the appended claims.

Referring to the drawings:

Fig. 6 is a side view of the rear end of a tractor and of a pickup plow in semidetached relation to the tractor, the near rear wheel of the tractor being omitted for purposes of disclosure;

Fig. 7 is an enlarged top view of a coupling device at the rear end of the tractor shown in Fig. 6;

Fig. 8 is a section on line VIII—VIII of Fig. 6;

Figure 1:
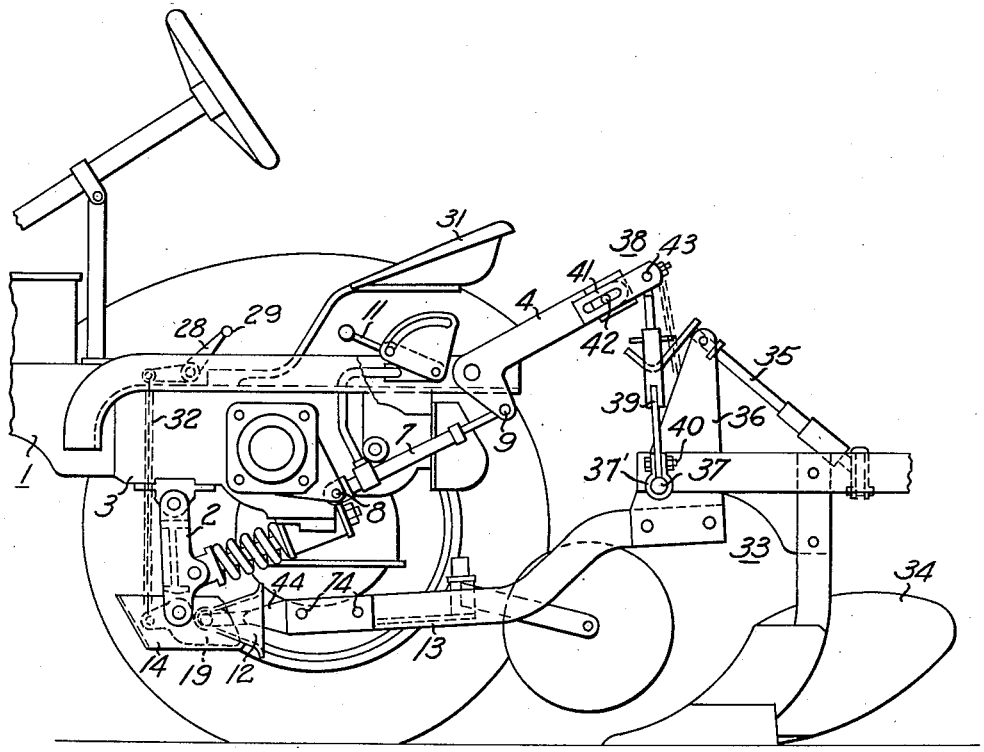
Fig. 1 is a side view of the rear end of a tractor and attached pickup plow, and near rear wheel of the tractor being omitted for purposes of disclosure.
Figure 9:
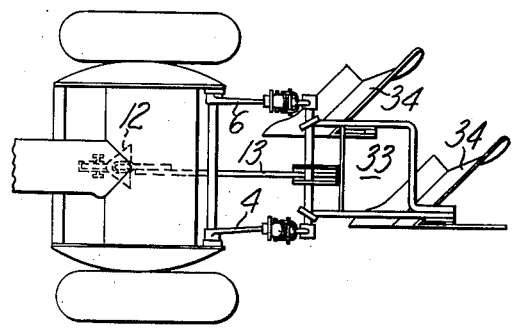
Fig. 9 is a top view, at a reduced scale and somewhat schematic, of the tractor and plow shown in Figs. 1 and 6, the tractor being equipped with two coupling devices of the type shown in Fig. 7.

Referring to Fig. 1, a conventional wheel type tractor 1 has a hitch yoke 2 depending from its main body 3, and a pair of transversely spaced implement lift arms 4 and 6, see Fig. 9, which are operatively mounted on a rearward portion of the tractor in rearwardly extending, up and down swingable relation thereto. The lift arms 4 and 6 are connected with a conventional hydraulic actuating mechanism including a ram 7 which is mounted on the tractor by a pivot pin 8 and hinged to a lever 9 on the arm 4. The hydraulic actuating mechanism also includes a valve mechanism, not shown, which is controlled by a hand lever 11 so as to either apply lifting power to the arms 4, or so as to place the arms into free floating condition for up and down movement relative to the tractor. A hydraulic actuating mechanism incorporating a ram such as the ram 7 and a valve mechanism which is controlled by a hand lever such as the lever 11 is fully disclosed, for instance, in U. S. Patent 2,332,629 granted October 26, 1943 to C. E. Frudden for Pump For Power Lifted Implements.

Pivotally mounted on the lower end of the depending hitch yoke 2 is a forwardly tapering bell housing 12 for the reception of the forward end of an implement hitch tongue 13. A bracket for mounting the bell housing 12 on the hitch yoke 2 comprises a U-shaped plate structure 14 which is welded to the outer surface of the bell housing 12 and mounts a pair of bearing bosses 16 and 17 for the reception of a pivot pin 18. A latch member 19 has a bearing boss between the opposite side walls of the bracket structure 14, and the pin 18 extends through aligned holes in depending lugs 21 and 22 of the hitch yoke 2 and through aligned holes in the bearing bosses 16, 17 and through the bearing boss of the latch member 19. In this manner, the bell housing 12 is pivotally movable relative to the hitch yoke 2, and the latch member 19 is pivotally movable relative to the bell housing about the axis of the pin 18.

Figure 3:
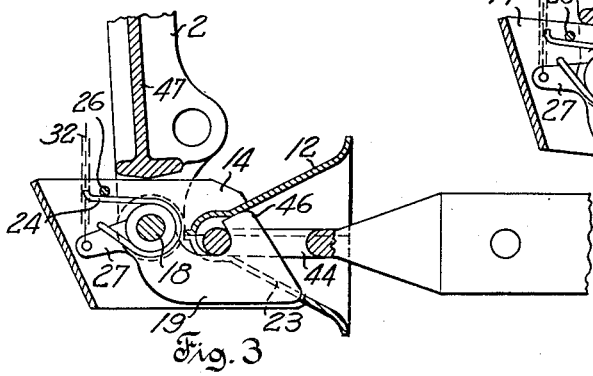
Fig. 3 is a section on line III—III of Fig. 2.

The latch member 19 has a hook portion which projects upwardly into the bell housing 12 through a bottom aperture 23 in the latter, and the latch member 19 is resiliently urged into an upward limit position in which it is shown in Fig. 3 by means of a pair of wire springs 24 within the bracket structure 14. A stop pin 26 extends transversely through the bracket structure 14 and serves as an abutment for the free upper ends of the springs 24. An arm 27 on the latch member 19 extends forwardly within the bracket structure 14 and serves as an abutment for the lower ends of the springs 24. In the assembled condition of the parts as shown in Fig. 3, the springs 24 are in loaded condition so as to bias the latch member 19 into the locking position in which it is shown in Fig. 3.

A control mechanism for the latch member 19 comprises a bell crank lever 28 which is pivotally mounted on the tractor in elevated relation to the bell housing 12 and has an actuating portion in the form of a foot pedal 29 for actuation by an operator positioned on the driver's seat 31 of the tractor. A chain 32 is connected at its opposite ends with the arm 27 of the latch member 19 and with the bell crank lever 28 so that the operator may swing the latch member 19 downwardly into a released position by stepping on the pedal 29, and when the operator takes his foot off the pedal the latch will return to its locking position by the action of the springs 24.

The pickup plow at the rear of the tractor as shown in Figs. 1, 6 and 9 is of generally conventional construction and comprises a rigid frame structure 33 on which a pair of plow bottoms 34 are rigidly mounted in conventional manner. An upright support 36 is mounted on the plow frame 33 for pivotal movement relative thereto about a transverse pivot member 37. A screw type adjusting mechanism 35 is operatively interposed between the plow frame 33 and the support 36 for effecting beaming adjustment of the plow, and the hitch tongue 13 is rigidly secured at its rear end to the lower end of the support 36.

As shown in Fig. 1, each of the implement lift arms 4 and 6 on the tractor mounts a conventional coupling device 38 for transmitting lifting power from the arms 4 and 6 to the plow unit through a pair of lift links 39. The coupling device 38 comprises a socket member 41 which is telescopically fitted upon the outer end of the associated lift arm and retained in fixed position by a withdrawable coupling pin 42. The lift link 39 at the left side of the plow is connected with a rearward portion of the socket 41 for pivotal movement relative to the socket and lift arm 4 by means of a pivot pin 43 and the lower end of the lift link 39 is connected with the pivot member 37 by a universal joint coupling 37' of conventional construction. A bolt 40 is disposed through joint coupling 37' and the lower end of lift link 39 to provide a pivot connection therebetween having a pivot axis transverse to the axis of pivot member 37. The other implement lift arm 6 of the tractor is connected with the right end of the pivot member 37 of the plow by means of a coupling device and lift link corresponding to those shown in Fig. 1.

Figure 2:
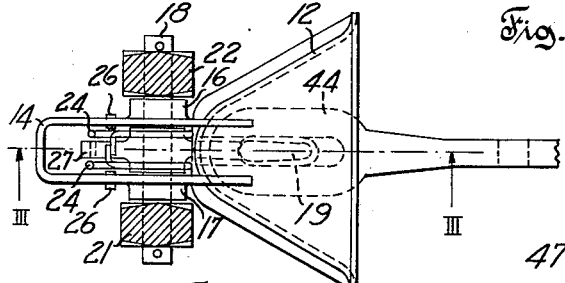
Fig. 2 is a top view of a coupling device forming part of the machine shown in Fig. 1.

In the condition of the machine as shown in Fig. 1, the plow rests on the ground and the control lever 11 for the hydraulic system is adjusted to a position which places the implement lift arms 4 and 6 in a free floating condition for up and down movement relative to the tractor. Upon upward adjustment of the control lever 11 from the position in which it is shown in Figs. 1 and 6, the hydraulic system becomes effective to apply lifting power to the arms 4 and 6 and, as a result, the plow will be raised about the contact point of the forward end of the hitch tongue 13 with the bell housing 12. As best shown in Fig. 2, a coupling member presenting an oblong loop 44 is detachably connected by means of a pair of bolts 74 to the forward end of the tongue 13, the loop 44 being engaged in forward draft transmitting and universally swingable relation with the hook portion of the latch member 19. In order to separate the tractor from the plow, the operator moves the control lever 11 from its raised position, not shown, to the position in which it is shown in Figs. 1 and 6 so that the plow will come to rest on the ground and the coupling devices 41 will carry no implement load and only the light downward load which may result from the tendency of the lift arms 4 and 6 to lower under their own weight. Removal of the coupling pins 42 releases the sockets 41 for withdrawal from the implement lift arms, and after the operator has disconnected the sockets 41 he may place the lift links 39 into any convenient position on the plow. The operator then mounts the tractor, starts the engine, steps on the foot pedal 29 to disengage the hook 19 from the loop 44, and drives the tractor away from the plow. After the bell housing has moved out of engagement with the forward end of the hitch tongue 13, the operator may take his foot off the pedal 29 and the plow in its detached condition will rest as a self-supported unit on the ground with the loop 44 in an elevated position substantially the same distance above the ground as that in which the tongue is shown in Fig. 1.

Figure 4:
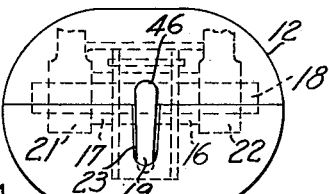
Fig. 4 is an end view of the coupling device shown in Figs. 2 and 3 with the implement hitch tongue omitted.
Figure 5:
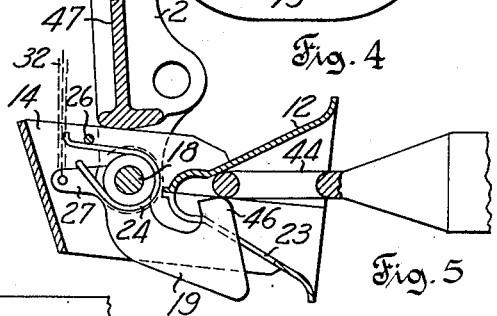
Fig. 5 is a sectional view similar to Fig. 3 with parts shown in different positions of relative adjustment.

In order to reattach the plow to the tractor, the operator backs the tractor toward the plow so as to engage the bell housing 12 with the loop 44 of the hitch tongue 13. Due to the large rear opening of the bell housing, it is not necessary for the operator to maneuver the tractor exactly in the longitudinal direction of the draft tongue 13, but he may come in at an angle or even on a somewhat laterally offset course. After the loop 44 has entered the bell housing 12, continued backward movement of the tractor will move the rearward slanting surface 46 of the latch member 19 into engagement with the round forward surface of the loop 44 and, as a result, the latch member 19 will be cammed downward as indicated in Fig. 5 so that the loop 44 may fully enter the bell housing until it hits the inside curved apex surface at the forward end of the latter. In that condition, the latch 19 will swing upward to the position in which it is shown in Fig. 4, thereby automatically establishing a forward draft transmitting connection between the tractor and the plow.

Pivotal movement of the bell housing 12 relative to the hitch yoke 2 on the tractor about the cross pin 18 is limited by contact of the top edges of the bracket structure 14 with the bottom surface of an I-rib 47 of the hitch yoke 2. The limited range of pivotal movement of the bell housing 12 relative to the hitch yoke 2 increases the permissible range of vertical misalignment between the bell housing and hitch tongue prior to their mating, and thereby facilitates the hitching operation which has been outlined hereinbefore.

After the draft transmitting connection between the tongue 13 and the tractor has been established, the operator may reconnect the lift links 39 with the lift arms 4 and 6, respectively, and the machine will then be ready for plowing.

If the tractor has been driven rearwardly toward the plow at an angle relative to the implement draft tongue 13, it may be difficult to reconnect the lift links 39 with the lift arms 4 and 6 because swinging movement of the lift link 39 about the pivot points on the plow and manual swinging movement of the free floating lift arms 4 and 6 on the tractor may not bring the upper ends of the lift links 39 into proper relation with the outer ends of the lift arms 4 and 6. However, this difficulty is easily overcome if the operator drives the tractor a short distance forward after the latch 19 has snapped into engagement with the loop 44, such short forward travel of the tractor being effective to bring the tractor and hitch tongue into an aligned condition in which the lift links and lift arms can readily be connected with each other.

It will be apparent that the hitching and unhitching operations as outlined hereinbefore may be performed without the use of any hand tools and without much effort or skill and in a minimum of time.

In the embodiment of the invention as shown in Fig. 6, the tractor and plow are identical with those described hereinbefore with reference to Figs. 1 to 5 and 9 but the lift arms 4 and 6 on the tractor are equipped with coupling devices 48 which are different from the coupling device 38 shown in Fig. 1. The coupling devices 48 provide for automatic separation of the lift links 39 from the lift arms 4 and 6 when the tractor is driven forwardly after the latch member 19 has been moved to its released position by actuation of the bell crank lever 28.

Figure 10:
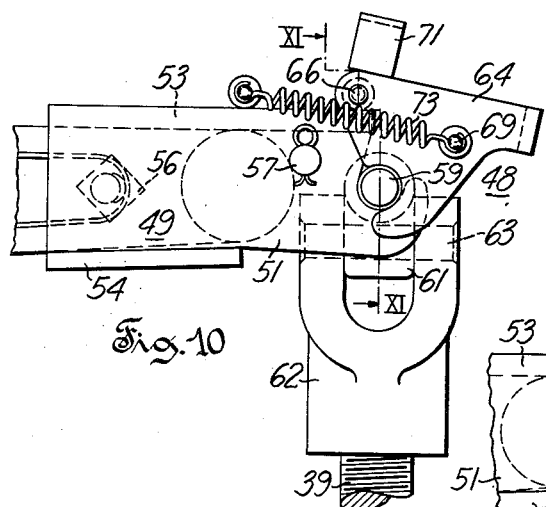
Fig. 10 is an enlarged side view of the coupling device shown in Fig. 7, the device being shown in the condition which it normally occupies when the implement is connected in operative relation to the tractor.

Referring to Figs. 7, 8, 10 and 11, each of the coupling devices 48 comprises a box shaped body or socket member 49, side walls 51 and 52 of which are rearwardly extended and connected by a top wall 53. At their bottom edges the side walls 51 and 52 are connected by a relatively short bottom wall 54 as best shown in Figs. 8 and 10. The side walls 51, 52, top wall 53 and bottom wall 54 define a socket for the reception of the rear end of the associated implement lift arm on the tractor, and a set screw 56 in the side wall 52 is provided to detachably secure the coupling device to its associated lift arm. A cross pin 57 is mounted in aligned apertures of the rearwardly extending side walls 51 and 52 so as to serve as an abutment which is radially engageable with the rearward outer end surface of the implement lift arm for the purpose of limiting forward sliding movement of the socket member 49 over the lift arm. The stop pin 57 is withdrawably mounted so that it can be readily replaced when it has become worn due to pounding against the rear end of the lift arm 4.

Figure 12:
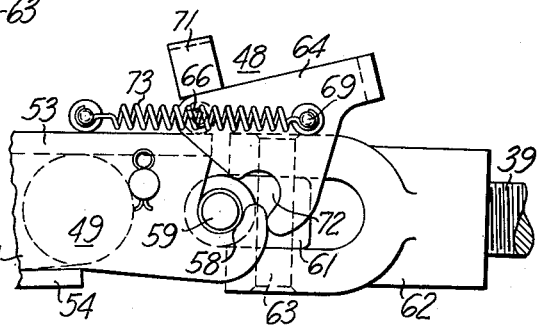
Fig. 12 is a side view similar to Fig. 10 with parts shown in a different position of relative adjustment.
Figure 11:
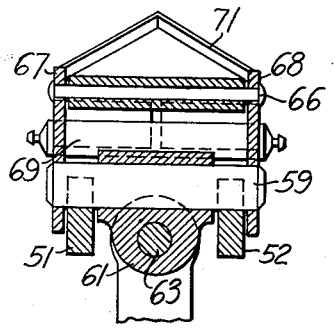
Fig. 11 is a section on line XI—XI of Fig. 10.

As best shown in Fig. 12, a concave upwardly facing bearing surface 58 is formed on the rearwardly extending side wall 51, and a similar bearing surface is formed on the other side wall 52 for the purpose of providing a jaw on which a cross stud 59 at the upper end of the lift link 39 may be supported in pivotal and upwardly separable relation to the socket member 49. The stud 59 is mounted in a knuckle piece 61 which is pivotally mounted in a forked rod end 62 by means of a rivet 63 as shown in Figs. 10 and 11. In order to releasably secure the stud 59 against upward separation from the jaw at the rear end of the socket member 49, a latch member 64 is mounted on the socket member 49 for pivotal movement about a transverse axis in elevated relation to the concave bearing surfaces 58, such pivotal mounting being afforded by a cross pin 66 which is welded to the top wall 53 of the socket 49. The latch 75

64 is made up of two plate metal side members 67 and 68 which are rigidly interconnected by means of a cross pin 69 and an angled bridge strap 71 which is welded to the top edges of the side members 67 and 68. Tail projections of the side plates 67 and 68 are bent toward each other to provide a handle for swinging the latch member 64 manually about the axis of the cross pin 66. The side member 67 has a generally semicircular recess 72 for cooperative engagement with the stud 59, and a similar recess is formed on the side member 68 of the latch member 64. A pair of tension springs 73 at opposite sides of the latch member 64 are operatively interposed between the latter and the socket member 49 in overcenter relation to the latch member, so that the springs will be effective, upon pivotal movement of the latch member about its pivot center, to bias the latch member alternately for swinging movement toward or away from the jaw at the rear end of the bracket member 49.

Figure 13:
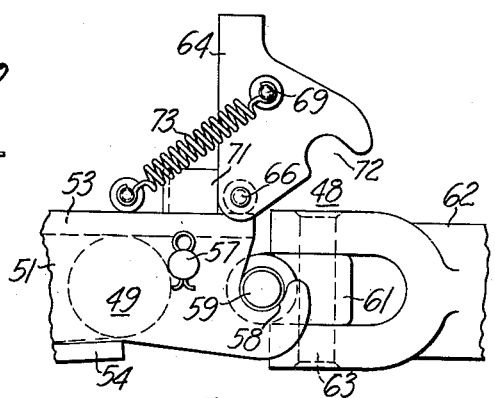
Fig. 13 is a view similar to Fig. 12 with parts adjusted to a condition of relative adjustment different from that shown in Fig. 12.

In the condition of the parts as shown in Fig. 10, the springs 73 act on lines of pull below the pivot axis of latch member 64 and consequently, the recesses 72 of the latch member 64 will be firmly urged into cooperative engagement with the stud 59. When the tractor is driven forwardly relative to the plow after the forward latch 19 has been released from the hitch tongue 13 while the plow remains standing on the ground and the lift arms are in a free floating condition, the lift links will initially remain connected with the jaws of the socket members 49, but as the tractor moves forward, the lift arms 4 and 6 will gradually move downward and the lift links 39 will gradually move forward until they are in straight alignment with each other as indicated in Fig. 6. The rear prong of the forked rod end 62 forms an abutment in the path of circular movement of the pin 69 about the pivot pin 66. As the lift links 39 gradually swing forward from the generally vertical position in which the lift link 39 is shown in Fig. 1 and the lift arms 4 and 6 gradually swing downward from the position in which the lift arm 4 is shown in Fig. 1, a condition will be reached in which the rear prong of the rod end 62 comes into contact with the spring anchor pin 69. This condition will be reached substantially in advance of the moment at which the lift links 39 assume the aligned position with the lift arms 4 and 6 which is illustrated in Fig. 6. After the fork 62 and pin 69 have come into contact with each other continued forward movement of the tractor and continued angular movement of the lift arms and lift links toward full alignment, as shown in Fig. 6, will impart an initial lifting movement to the latch 64, and a condition will then be reached in which the lines of pull of the springs 73 intersect the pivot center of the latch 64. This condition is illustrated in Fig. 12 and will be reached shortly before the fully aligned position of the lift arms and lift links is attained. Continued straightening movement of the lift arms and lift links will cause continued rearward and upward swinging movement of the rod end 62 relative to the socket member or hanger element 49 about the axis of the stud 59, and as a result the springs 73 will move slightly overcenter before the fully aligned condition of the lift arms and lift links is attained. Such slight overcenter movement of the springs 73 will immediately become effective to suddenly throw the latch member 64 to its fully raised position in which it is shown in Figs. 6 and 13, and which position is limited by engagement of the angled bridge strap 71 with the top surface 53 of the socket member 49. Also, when the fully aligned condition of the arms 4 and 6 and links 39 is attained, continued forward movement of the tractor will become effective to cam the stud 59 out of the concave bearing surfaces 58, and the lift arms, therefore, become automatically detached from the lift arm 39 by merely driving the tractor away from the plow.

Reattachment of the tractor shown in Fig. 6 to the plow is accomplished in generally the same manner as described hereinbefore with reference to Fig. 1. That is, the studs 59 at the upper ends of the lift links 39 are manually placed into the jaws at the rear ends of the lift arms after the tractor has been backed into attaching relation to the plow and the latch 19 in the bell housing has been automatically engaged with the loop 44 at the forward end of the hitch tongue 13. The hitching operation is completed by manually throwing the latch members 64 into their lowered positions.

The hitch system incorporating the self-releasing coupling devices 48 lends itself for use with any type of pickup implement and provides for extremely rapid attachment of the implement to and practically instantaneous detachment of the implement from the tractor.

A pair of power lift arms, such as the arms 4 and 6, and a hydraulic actuating mechanism which may be operated selectively to either swing the arms upwardly by power or to place them into a free floating condition in which they may be swung back and forth manually or otherwise from one limit position to another without appreciable resistance, are well known in the art and are commonly incorporated in farm tractors. Likewise, it is a common practice to provide various types of implements, such as plows, harrows, field cultivators, listers and the like, with a pair of lift chains or with a pair of lift links which are connected at their lower ends, like the lift links 39 in Figs. 1 and 6, with the implement for universal swinging movement relative to the latter. If a farmer owns one of the mentioned tractors and several implements which may be used with that tractor and which are each equipped with a pair of lift chains or links as stated, he may provide the tractor with a self-latching manually releasable coupling device such as the bell housing 12 and the latch hook 19. Additionally, each of the several implements may be equipped with a hitch loop such as the loop 44, and with a pair of lift force transmitting coupling devices of the kind shown in Fig. 1, or preferably of the kind shown in Figs. 6 through 13. The installation of the mentioned draft transmitting and lift force transmitting coupling devices will enable the farmer to get the tractor ready for work with any one of the different implements quickly and conveniently, and without tools.

For instance, if the tractor has been used with a plow as shown in Fig. 1 or as shown in Fig. 6, and it is desired to use the tractor with any of the other implements (not shown), a farmer may drop the plow wherever he wants to put it, usually some place in the barnyard, drive the tractor away from the plow and back it up toward the desired other implement which may be standing somewhere else.

The barnyard or other place where the change of implements is to be made will ordinarily be natural ground, that is, it will neither be level nor even, and it may have vegetation, so that it would be difficult to align the tractor and the implement with any degree of accuracy before they are connected together. The herein disclosed power lift system takes care of this difficulty in that it is operable to first establish a universally swingable draft transmitting connection between the tractor and the implement, and then to establish two lift force transmitting connections, one after the other, between the tractor and the implement at opposite sides, respectively, of the latter, so that lifting power may be applied to one side of the implement through one of said lift force transmitting connections for tilting the implement laterally relative to the tractor preparatory to the establishment of the other of said lift force transmitting connections.

Assuming, for instance, that due to ground irregularities an implement having a pair of equally long lift links is in a laterally tilted condition relative to the tractor after the coupling loop 44 has been engaged by the latch hook 19, the two lift force transmitting connections between the tractor and the implement may then be established as follows without changing the length of either lift link. An operator on the tractor seat, by leaning backward, may take hold of the socket 41 or of the knuckle piece 61, as the case may be, on the lift link 39 at the low side of the implement, and engage it with the adjacent tractor power lift arm. For the performance of this part of the connecting operation the power lift arms are preferably placed in the free floating condition which has been mentioned hereinbefore. Next, the operator may apply lifting power to the connected lift link at the low side of the implement by manipulation of the hand lever 11, and continue such application of lifting power until the lower ends of both lift links 39 are on a level approximately parallel to the pivot axis of the power lift arms 4 and 6 on the tractor. It will then be an easy matter to connect the other socket 41 or knuckle piece 61, as the case may be, in lift force transmitting relation with the other power lift arm. In a similar manner a pair of lift force transmitting connections may be established between a tractor and a plow on which the lift link at one side is longer than the lift link at the other side for winging purposes.

In general terms, the herein disclosed hitch and power lift system comprises a coupling device having relatively engageable and disengageable component elements, as represented by the latch member 19 and loop 44, which are operatively connected, respectively, with the tractor and implement and are operable to automatically establish a universal draft transmitting connection between the tractor and implement by relative movement of the tractor and implement in a mutually approaching direction. Control means, as represented by the lever 28 and associated chain 32, are mounted on the tractor and manually operable to interrupt said draft transmitting connection at the will of the operator. Lift force transmitting means include a pair of elongated members as represented by the lift links 39, which are universally connected with the implement at opposite sides, respectively, of the latter, and a pair of separable connecting devices such as the connecting devices 38 or 48, which are operatively associated, respectively, with said elongated members and with said power lift arms, so that either of said elongated members may be connected with its respective power lift arm to establish one of the mentioned lift force transmitting connections between the tractor and implement without restraining universal movement of the other elongated member relative to the implement. The hydraulic actuating mechanism including the ram 7 and hand lever 11 represents actuating means for the power lift arms which are operable to control the application of lifting power to said arms.

The separable universal connecting devices which are afforded by the knuckle pieces 61 and associated socket 49, each include a pair of stud portions which are afforded by the axially opposite ends of stud 59 and extend in opposite directions from the knuckle piece 61 in right angle relation to the hinge axis on which the knuckle piece is pivoted to its associated lift force transmitting element 39, such hinge axis being afforded in the illustrated embodiment of the invention by the rivet 63 (Fig. 13). Each of the sockets 49 represents a hanger element having a pair of arms straddling the associated knuckle piece so as to supportingly engage the end portions of the stud 59 from below, and each pair of hanger arms presents upwardly facing recesses 58 for removably seating the stud portions of the knuckle piece on its associated hanger element. The latch 64 represents a bifurcated retainer which is pivoted on its associated hanger element 49 for swinging movement into and out of cooperative engagement with the stud 59; and overcenter spring means including the coil springs 73 are operatively associated with said retainer for selectively positioning the latter either in cooperative locking engagement with the stud 59 (as shown in Fig. 10) or in upwardly tilted relation to the stud seating recesses 58 of the associated hanger arms as shown in Fig. 13.

The spring anchor pin 69 on the latch or retainer element 64 represents an abutment portion which is engageable with the associated lift force transmitting element so that the swinging movement of the lift force transmitting elements 39 into radial relation to the pivot axis of the power lift arms 4 and 6 will initiate swinging movement of the retainer element 64 out of locking engagement with the stud 59.

It should be understood that it is not intended to limit the invention to the hereinabove described forms and details, and that the invention includes such other forms and modifications as are embraced by the scope of the appended claims.

It is claimed and desired to secure by Letters Patent:

1. A hitch and power lift system for connecting an implement with a tractor, said system comprising, in combination, a coupling device having relatively engageable and disengageable component elements operatively connected, respectively, with said tractor and implement and being operable to automatically establish a universally swingable draft transmitting connection between said tractor and implement by relative movement of said tractor and implement in a mutually approaching direction; control means for said coupling device mounted on said tractor and manually operable to interrupt said draft transmitting connection; a pair of power lift arms mounted on said tractor for up and down swinging movement relative thereto about a transverse axis; actuating means for said power lift arms operable to control the application of lifting power thereto; and lift force transmitting means including a pair of elongated members universally connected with said implement at one side and at the other side, respectively, thereof, and a pair of separable connecting devices operatively associated, respectively, with said elongated members and with said power lift arms, so that either of said elongated members may be connected with its respective power lift arm to establish one of said lift force transmitting connections without restraining universal movement of the other of said elongated members relative to said implement, said separable connecting devices each comprising a knuckle piece pivotally connected with the associated elongated member for swinging movement on a hinge axis extending in right angle relation to said transverse axis of swinging movement of said power lift arms, stud portions connected with and extending in opposite directions from said knuckle piece in right angle relation to said hinge axis, and a hanger element rigidly connected with the associated lift arm and having a pair of hanger arms straddling said knuckle piece so as to supportingly engage said stud portions from below, said hanger arms having upwardly facing recesses for removably seating said stud portions on said hanger element, and locking means pivotally mounted on said hanger element and positionable in cooperative locking engagement with said stud portions from above.

2. A hitch and power lift system as set forth in claim 1, wherein said locking means associated with each of said separable connecting devices further includes a bifurcated retainer pivoted on said hanger element for swinging movement into and out of cooperative engagement with said stud portions, and overcenter spring means operatively associated with said retainer for selectively positioning the latter either in cooperative locking engagement with said stud portions or in upwardly tilted relation to said stud seating recesses of said hanger arms.

3. A hitch and power lift system as set forth in claim 2, wherein said retainer element has an abutment portion engageable with the associated elongated member so that rearward and upward swinging movement of said elongated member relative to said hanger element on the axis of said stud portions will initiate swinging movement of said retainer element out of locking engagement with said stud portions.

References Cited in the file of this patent

UNITED STATES PATENTS

| | | |
|---|---|---|
| 1,375,266 | Weber | Apr. 19, 1921 |
| 1,475,257 | Bottone | Nov. 27, 1923 |
| 1,507,525 | Stewart | Sept. 2, 1924 |
| 1,572,142 | Hood | Feb. 9, 1926 |
| 2,184,422 | Graham | Dec. 26, 1939 |
| 2,200,654 | Ruhl | May 14, 1940 |
| 2,332,629 | Frudden | Oct. 26, 1943 |
| 2,381,258 | Cantral | Aug. 7, 1945 |
| 2,420,530 | Evans | May 13, 1947 |
| 2,430,696 | Acton | Nov. 11, 1947 |
| 2,476,439 | Court | July 19, 1949 |
| 2,478,591 | Miller | Aug. 9, 1949 |
| 2,505,609 | Ego | Apr. 25, 1950 |
| 2,688,908 | Reaves | Sept. 14, 1954 |
| 2,723,613 | Walberg | Nov. 15, 1955 |
| 2,732,784 | Tanke et al. | Jan. 31, 1956 |

FOREIGN PATENTS

| | | |
|---|---|---|
| 406,178 | Germany | Nov. 14, 1924 |
| 274,497 | Great Britain | Dec. 29, 1927 |
| 114,832 | Australia | Mar. 4, 1942 |
| 462,491 | Canada | Jan. 17, 1950 |